(12) United States Patent
Chang et al.

(10) Patent No.: US 9,901,086 B1
(45) Date of Patent: Feb. 27, 2018

(54) BRAKE MECHANISM OF FISHING REEL

(71) Applicant: OKUMA FISHING TACKLE CO., LTD., Taichung (TW)

(72) Inventors: Liang-Jen Chang, Taichung (TW); Ching-Po Liao, Taichung (TW)

(73) Assignee: OKUMA FISHING TACKLE CO., LTD., Taichung (TW)

( * ) Notice: Subject to any disclaimer, the term of this patent is extended or adjusted under 35 U.S.C. 154(b) by 0 days.

(21) Appl. No.: 15/398,099

(22) Filed: Jan. 4, 2017

(51) Int. Cl.
*A01K 89/033* (2006.01)

(52) U.S. Cl.
CPC .................................. *A01K 89/058* (2015.05)

(58) Field of Classification Search
CPC .............. A01K 89/015; A01K 89/0187; A01K 89/0188; A01K 89/01905; A01K 89/01907; A01K 89/01909
See application file for complete search history.

(56) References Cited

U.S. PATENT DOCUMENTS

| | | | | |
|---|---|---|---|---|
| 4,899,953 | A * | 2/1990 | Toda | A01K 89/033 242/223 |
| 4,947,969 | A * | 8/1990 | Tarlton, Sr. | F16D 65/12 188/218 XL |
| 5,018,682 | A * | 5/1991 | Aoki | A01K 89/033 242/268 |
| 5,192,036 | A * | 3/1993 | Sato | A01K 89/033 242/268 |
| 5,393,004 | A * | 2/1995 | Weaver | A01K 89/0275 242/244 |
| 5,588,605 | A * | 12/1996 | Yamaguchi | A01K 89/033 242/268 |
| 9,807,991 | B1* | 11/2017 | Chang | A01K 89/046 |
| 2012/0056028 | A1* | 3/2012 | Kawasaki | A01K 89/015 242/267 |
| 2015/0208632 | A1* | 7/2015 | Hyun | A01K 89/033 242/268 |

* cited by examiner

*Primary Examiner* — Emmanuel M Marcelo
(74) *Attorney, Agent, or Firm* — Muncy, Geissler, Olds & Lowe, P.C.

(57) ABSTRACT

A brake mechanism of a fishing reel is provided. The fishing reel has a shaft and a gear. The brake mechanism includes a washer set, a tubular member, a brake adjusting device, a first stair portion and a spring member. The washer set includes a first driving washer sleeved at non-circular section of the shaft, and a first brake washer located between the first driving washer and the gear. The tubular member is movably disposed at non-circular section of the shaft and abutted against the washer set. The brake adjusting device is sleeved to the shaft, abutted against the tubular member, and includes a control member screwingly engaged to thread section of the shaft. The spring member is sleeved to the shaft and abutted against the first driving washer and first stair portion, respectively. Accordingly, the fishing reel not only brakes reliably, but also releases a brake status properly.

10 Claims, 9 Drawing Sheets

BRAKE MECHANISM OF FISHING REEL

BACKGROUND OF THE INVENTION

1. Field of the Invention

The present invention relates generally to fishing reel and more particularly, to a brake mechanism of a fishing reel.

2. Description of the Related Art

In general, a fishing rod would be equipped with a fishing reel, so that a user can cast a fishing lure or bait to a further distance and pull a fish back by the fishing reel when the fish is hooked. In addition, a user can use a brake mechanism of the fishing reel to confront a larger and stronger fish. For example, if a fishing reel with a spool driven by a gear sleeved to a shaft is used, a user can adjust a frictional force between a washer set of the brake mechanism and the gear, so that a damping for a motion which the spool rotates relative to the shaft is changed, and stamina of the fish can be depleted, or a fishing line being broken or a hook being unhooked by the fish can be prevented. However, the washer set is usually consist of one or more pairs of driving washers and brake washers, and part of driving washers has a non-circular hole through which the shaft extends and is sleeved at a non-circular section of the shaft, so that the driving washers can rotate along with the shaft. In the practical operation, the driving washers may be stuck on the shaft, so that a brake status of the brake mechanism cannot be released. Accordingly, how to provide a structure for effectively releasing the brake status is one of objectives which the related industry wants to achieve.

SUMMARY OF THE INVENTION

The present invention has been accomplished in view of the above-noted circumstances. It is an objective of the present invention to provide a brake mechanism of a fishing reel. The brake mechanism can prevent a situation that the washer set is stuck on the shaft and may not able to move axially. Therefore, a brake status of the brake mechanism can be released reliably.

To attain the above objective, the present invention provides a brake mechanism of a fishing reel. The fishing reel has a main body, a shaft rotatably disposed at the main body, a handle disposed at the shaft and rotatable along with the shaft, a gear sleeved to the shaft, and a spool disposed at the main body and rotatable by the gear. The shaft has a circular section to which the gear is sleeved, a non-circular section extending outwardly from the circular section, and a thread section extending outwardly from the non-circular section. The brake mechanism includes a washer set, a tubular member, a brake adjusting device, a first stair portion and a spring member. The washer set includes a first driving washer having a first non-circular hole through which the shaft extends and sleeved at the non-circular section, and a first brake washer sleeved at the non-circular section of the shaft and located between the first driving washer and the gear; the first driving washer is coupled with the shaft and rotatable along with the shaft. The tubular member is axially movably disposed at the non-circular section of the shaft and provided with an end abutting against an outer side of the washer set. The first stair portion is located between the circular section and the non-circular section. The brake adjusting device is sleeved to the shaft and abutted against an outer side of the tubular member and includes a control member screwingly engaged to the thread section of the shaft. The spring member is sleeved to the shaft and provided with two ends abutting against the first driving washer and the first stair portion, respectively.

The present invention further provides another brake mechanism of a fishing reel. The fishing reel has a main body, a shaft rotatably disposed at the main body, a handle disposed at the shaft and rotatable along with the shaft, a gear sleeved to the shaft, and a spool disposed at the main body and rotatable by the gear. The shaft has a circular section to which the gear is sleeved, a non-circular section extending outwardly from the circular section, and a thread section extending outwardly from the non-circular section. The brake mechanism includes a washer set, a tubular member, a brake adjusting device, a second stair portion and a spring member. The washer set includes a first driving washer having a first non-circular hole through which the shaft extends and sleeved at the non-circular section, a first brake washer sleeved at the non-circular section of the shaft and located between the first driving washer and the gear, a second driving washer having a circular hole through which the shaft extends and located outside the first driving washer, a second brake washer sleeved at the non-circular section of the shaft and located between the second driving washer and the first driving washer, a third driving washer having a second non-circular hole through which the shaft extends and sleeved at the non-circular section outside the second driving washer, and a third brake washer sleeved at the non-circular section of the shaft and located between the second driving washer and the third driving washer; the first and third driving washers are coupled with the shaft and rotatable along with the shaft; and the second driving washer is coupled with the gear and rotatable together with the gear. The tubular member is axially movably disposed at the non-circular section of the shaft and provided with an end abutting against an outer side of the third driving washer. The second stair portion is located between a large non-circular section and a small non-circular section extending outwardly from the large non-circular section; the large non-circular section and the small non-circular section form the non-circular section of the shaft. The brake adjusting device is sleeved to the shaft and abutted against an outer side of the tubular member, and the brake adjusting device includes a control member screwingly engaged to the thread section of the shaft. The spring member is sleeved to the shaft and provided with two ends abutting against the third driving washer and the second stair portion, respectively.

Accordingly, when the fishing reel is in the brake status, the spring member can provide a prestressing force to release the brake status. Therefore, when the control member is screwingly threaded outwardly, the driving washers abutting against the spring member would move outwardly, so as to release the brake status. Even though the driving washers abutting against the spring member are stuck on the shaft, the driving washers still can be separated from the shaft by the spring member.

DETAILED DESCRIPTION OF THE INVENTION

Figure 1:
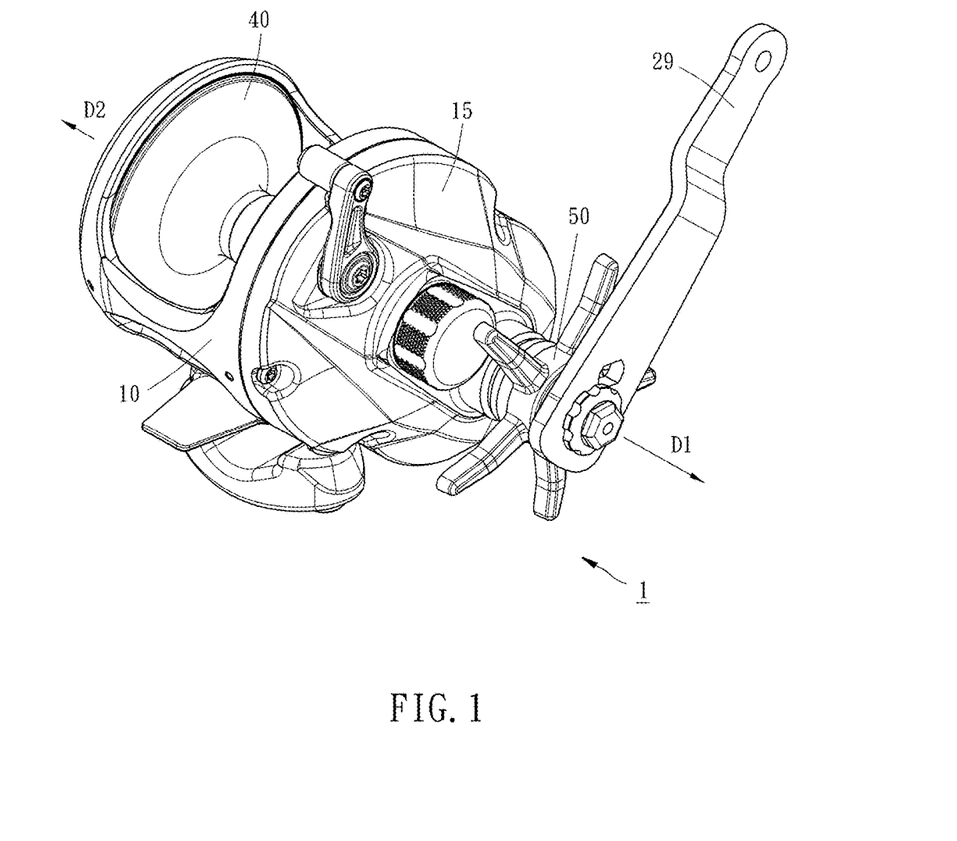
FIG. 1 is a perspective view of a fishing reel according to a first preferred embodiment of the present invention.
Figure 2:
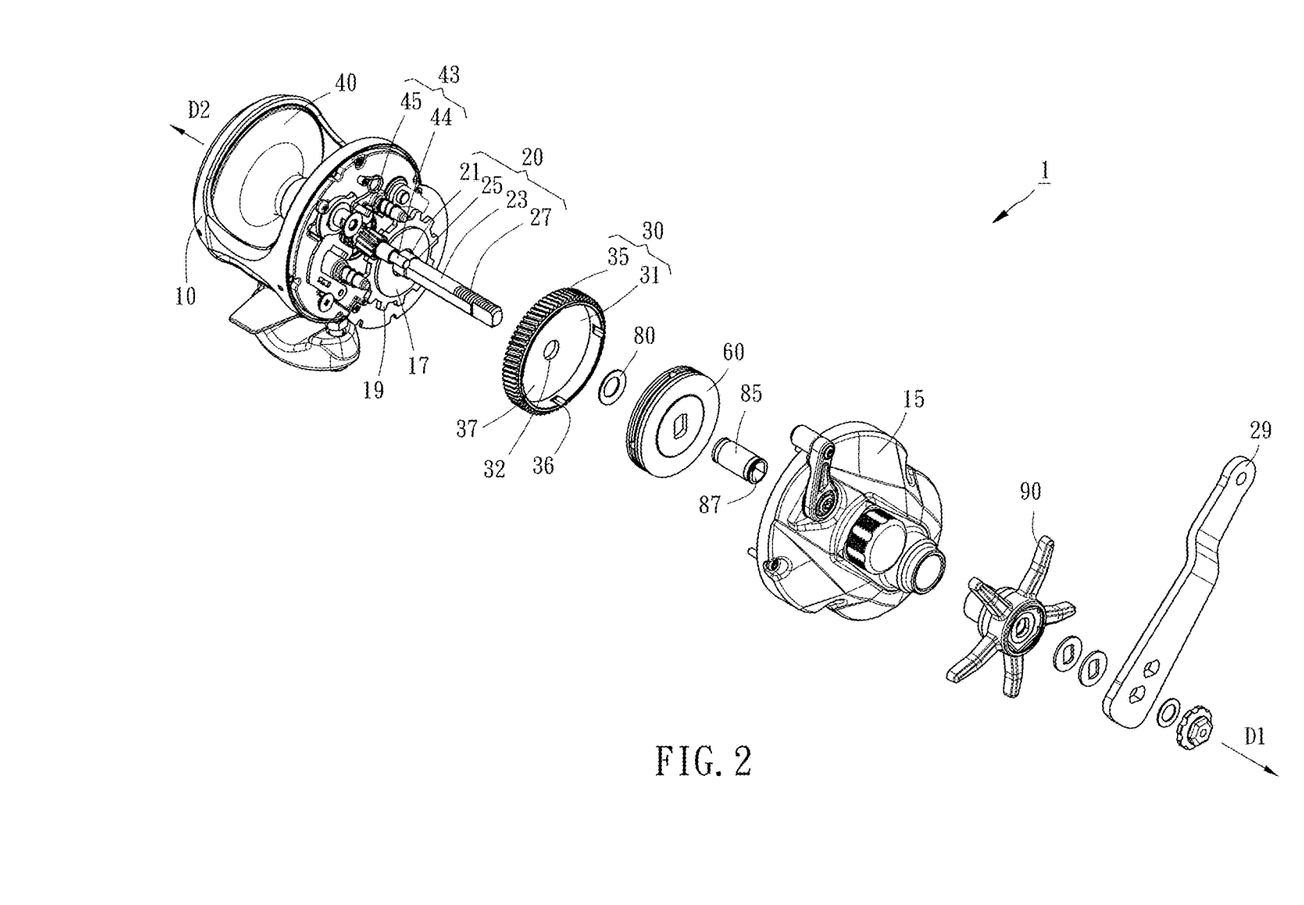
FIG. 2 is an exploded perspective view of part of the fishing reel according to the first preferred embodiment of the present invention.
Figure 5:
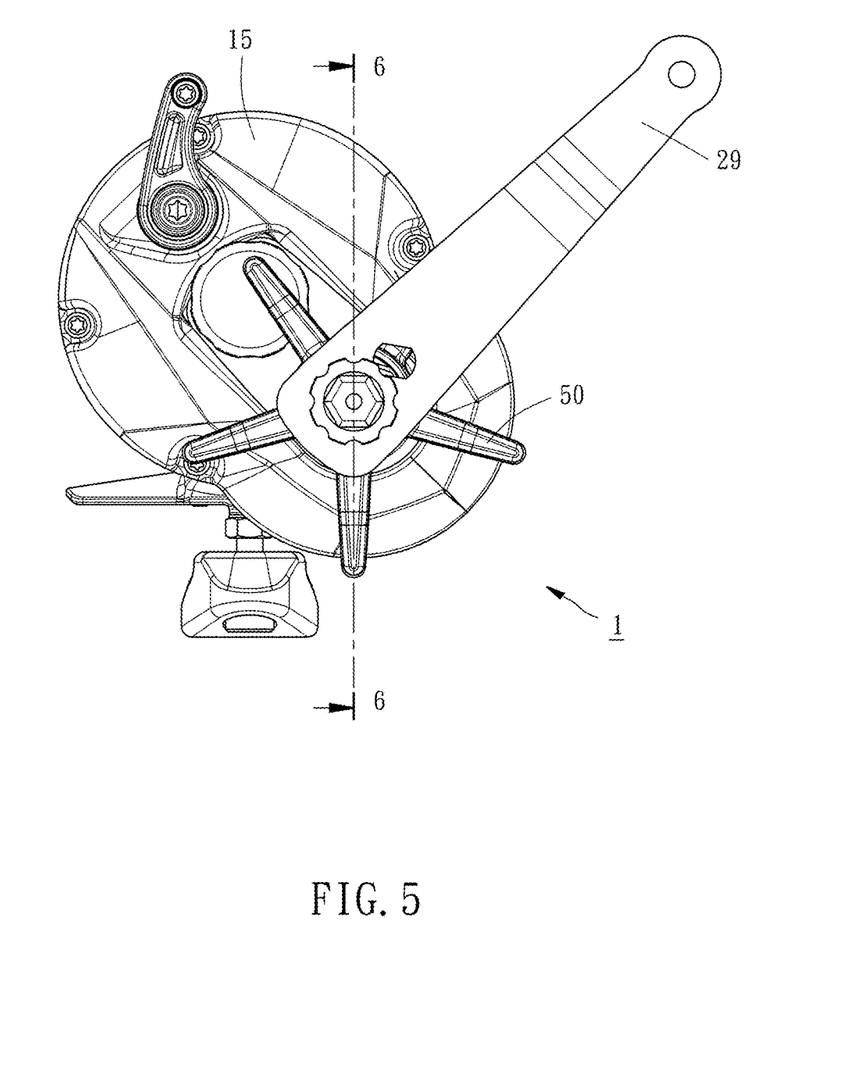
FIG. 5 is a side view of the fishing reel according to the first preferred embodiment of the present invention.

Referring to FIGS. 1, 2 and 5, a fishing reel 1 according to a first preferred embodiment of the present invention includes a main body 10, a side cover 15, a shaft 20, a handle 29, a gear 30, a spool 40, a transmitting device 43 and a brake mechanism 50. It should be noticed that, in the present description, a direction D1 as shown in FIG. 1 points to outside of the fishing reel 1, and a direction D2 points to inside of the fishing reel 1.

The side cover 15 is disposed at a side of the main body 10. The shaft 20 is extended outwardly from the main body 10 and rotatably disposed at the main body 10. The shaft 20 includes a circular section 21 sleeved by the gear 30, a non-circular section 23 extending outwardly from the circular section 21, and a thread section 27 extending outwardly from the non-circular section 23.

An end of the handle 29 is disposed at the shaft 20, and the handle 29 can drive the shaft 20 to rotate together.

The gear 30 has a disk body 31 having an axial hole 32 and an annular teeth portion 35 extended radially and outwardly from an outer periphery of the disk body 31. Four notches 36 are disposed at the side of the annular teeth portion 35 toward the axial hole 32. The disk body 31 and the annular teeth portion 35 are rounding to form a circular notch 37. Furthermore, the gear 30 can rotate relative to the shaft 20.

The spool 40 is rotatably disposed at the main body 10. The transmitting device 43 has a spindle 44 connected with the spool 40 and rotatable together with the spool 40, and a second gear 45 disposed at the spindle 44 and engaged with the annular teeth portion 35 of the gear 30, so that the spool 40 can be driven by the gear 30 to rotate. On the other hand, when a fishing line is reeled out from the spool 40, the gear 30 can be driven by the transmitting device 43 to rotate.

Referring to FIGS. 2 to 4 and 6, the brake mechanism 50 has a washer set 60, a spring member 80, a tubular member 85, a first stair portion 25 located between the circular section 21 and the non-circular section 23, and a brake adjusting device 90.

Figure 3:
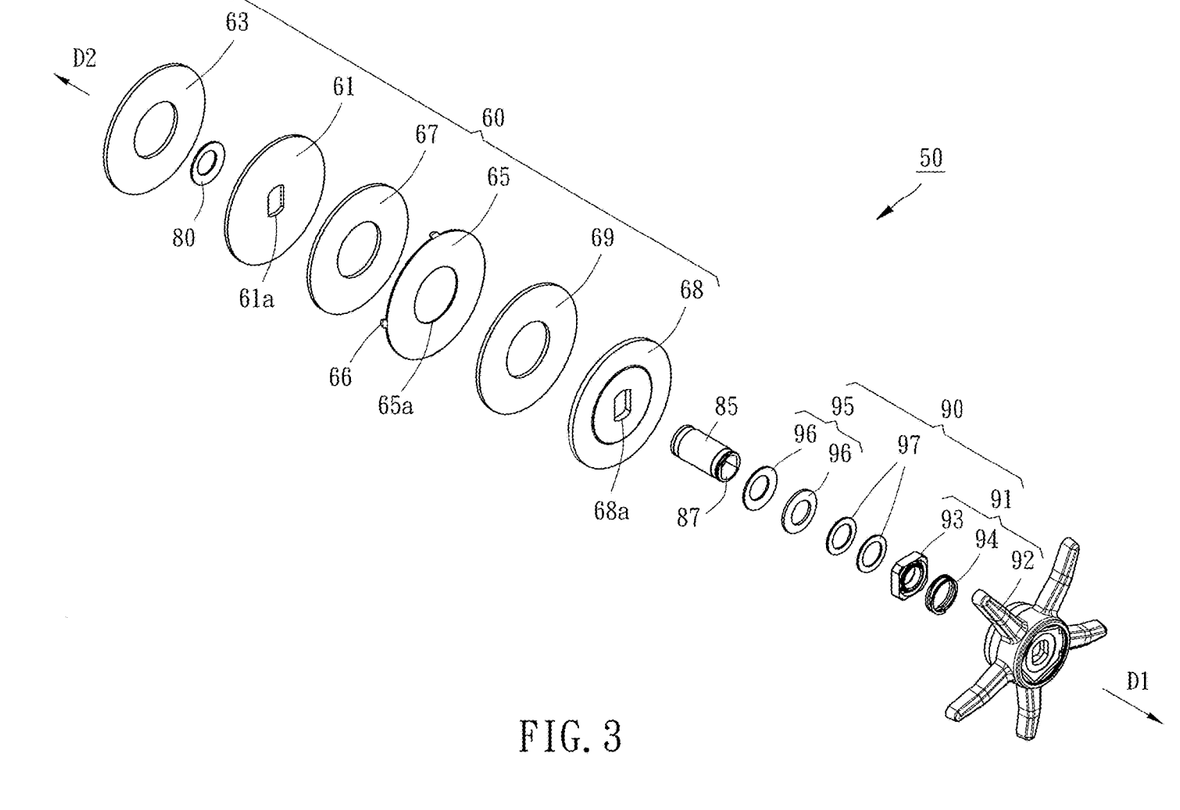
FIG. 3 is an exploded perspective view of a brake mechanism of the fishing reel according to the first preferred embodiment of the present invention.
Figure 4:
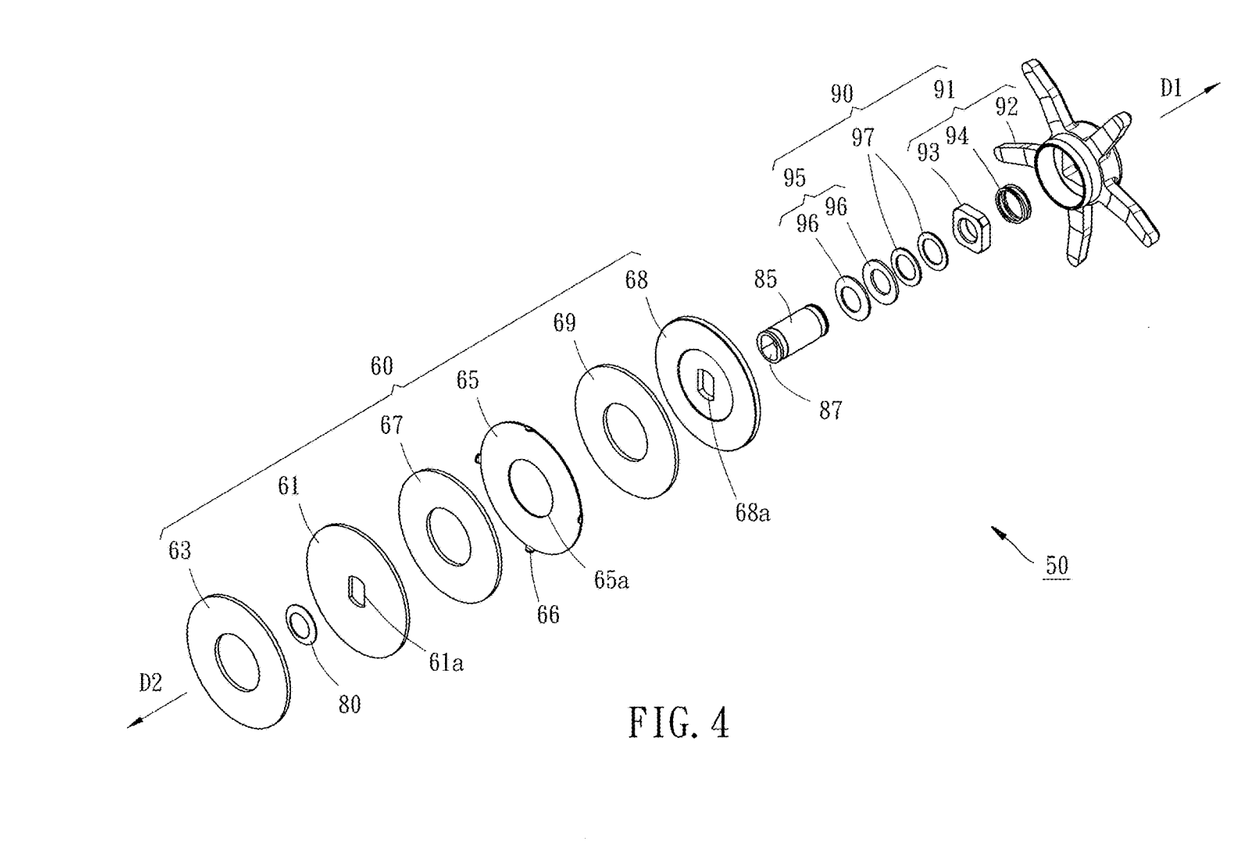
FIG. 4 is another exploded perspective view of the brake mechanism of the fishing reel according to the first preferred embodiment of the present invention.
Figure 6:
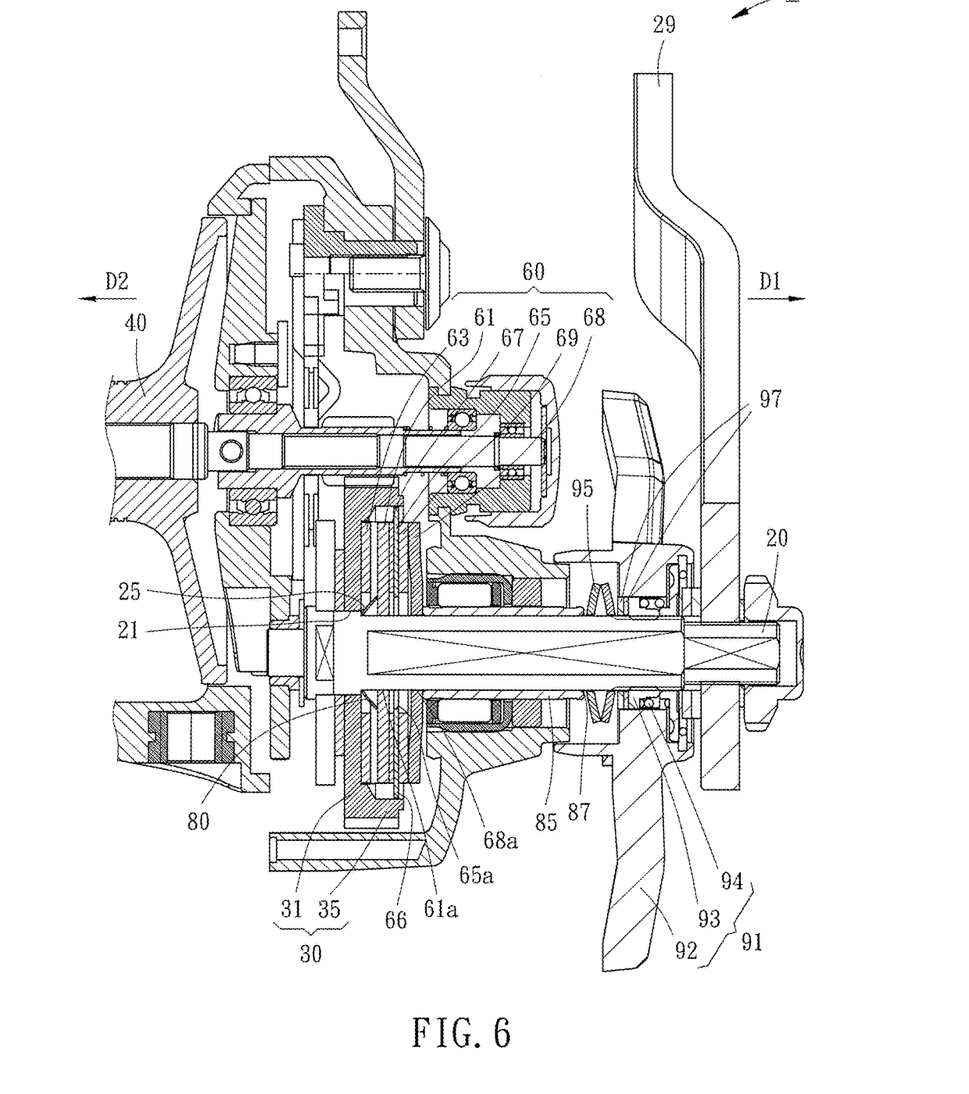
FIG. 6 is a section view of part of FIG. 5 along a direction 6-6, which illustrates the fishing reel is in a non-brake status.

Referring to FIGS. 3, 4 and 6, the washer set 60 is accommodated in the circular notch 37 of the gear 30. The washer set 60 includes a first driving washer 61 having a first non-circular hole 61a through which the shaft 20 extends and sleeved at the non-circular section 23, a first brake washer 63 sleeved at the non-circular section 23 of the shaft 20 and located between the first driving washer 61 and the gear 30, a second driving washer 65 having a circular hole 65a through which the shaft 20 extends and sleeved at the non-circular section 23, a second brake washer 67 sleeved at the non-circular section 23 of the shaft 20 and located between the second driving washer 65 and the first driving washer 61, a third driving washer 68 having a third non-circular hole 68a through which the shaft 20 extends and sleeved at the non-circular section 23, and a third brake washer 69 sleeved at the non-circular section 23 of the shaft 20 and located between the second driving washer 65 and the third driving washer 68. The first and third driving washers 61, 68 are coupled with the shaft through the first and second non-circular holes 61a, 68a and rotate along with the shaft 20. A periphery of the second driving washer 65 has four protruded portions 66 respectively inserting into the four notches 36, so that the second driving washer 65 is coupled with the gear 30 and rotatable together with the gear 30, which means the second driving washer 65 can rotate relative to the shaft 20. Furthermore, when an external force toward the direction D2 is applied on the washer set 60, the whole washer set 60 would transmit the external force the gear 30, so that frictional forces for rotations of the gear 30 and the second driving washer 65 relative to the first and third driving washers 61, 68 would be enlarged with the external force.

It should be noticed that, there may be lots of embodiments of the washer set 60. For example, the washer set 60 may merely have the first driving and brake washers 61, 63; the washer set 60 may have more second and third driving washers 65, 68 and more second and third brake washers 67, 69; or a fourth brake washer 17 and a fourth driving washer 19 coupled with the shaft 20 and rotatable along with the shaft 20 may be disposed at an inner side of the gear 30 as shown in FIG. 2, and any structure which is capable of braking the gear 30 can be applied.

Figure 7:
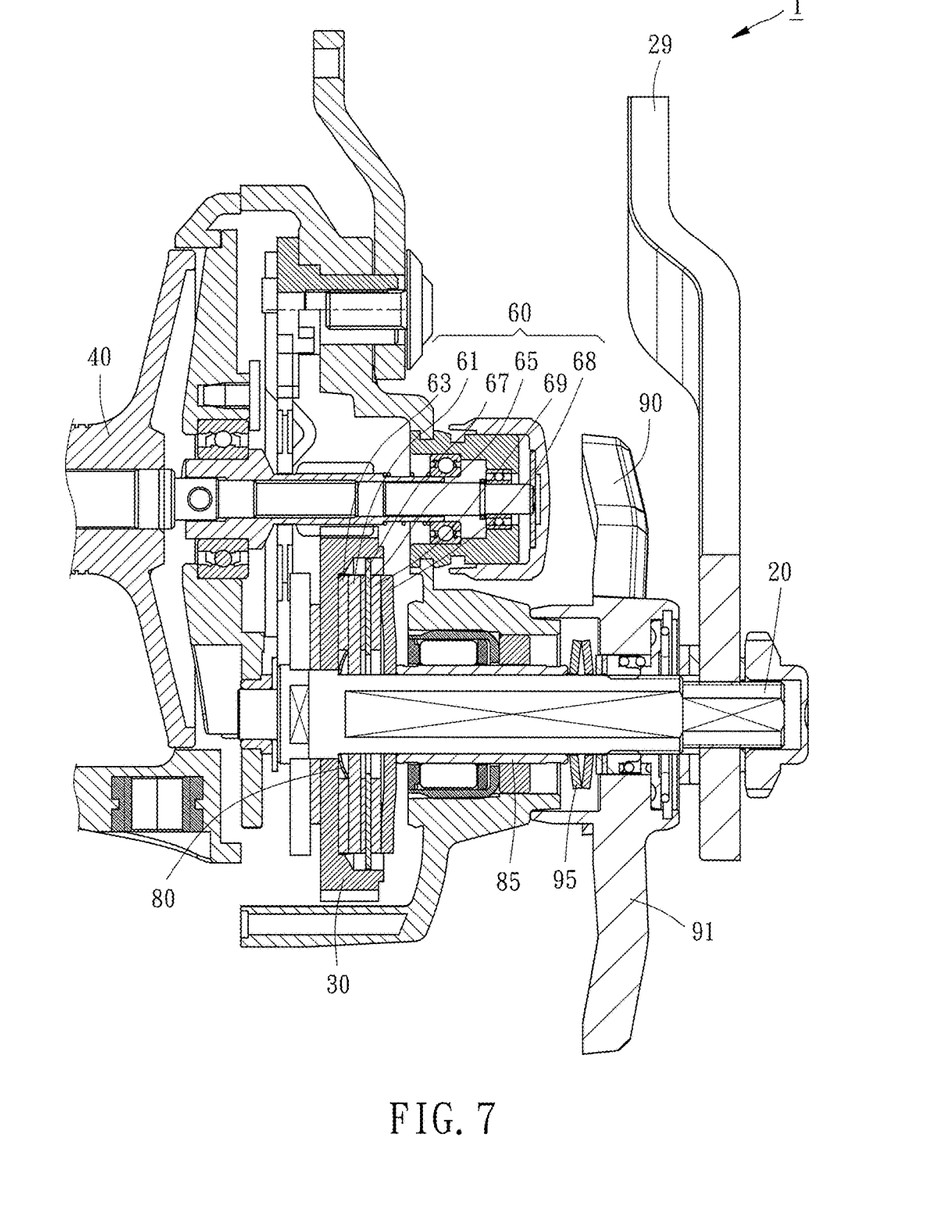
FIG. 7 is another section view of the fishing reel according to the first preferred embodiment of the present invention, which illustrates the fishing reel is in a brake status.

Referring to FIGS. 3, 4 and 6, the spring member 80 is sleeved at the non-circular section 23 of the shaft 20 and provided with two ends respectively abutting against an outer side of the stair portion 25 and an inner side of the bushing portion 71, and the spring member 80 is a spring washer. Therefore, a force toward the direction D1 would be applied on the first driving washer 61 by the spring member 80. Furthermore, when another force toward the direction D2 is applied on the washer set 60, the spring member 80 can be pressed as shown in FIG. 7.

Referring to FIGS. 3, 4 and 6, the tubular member 85 is axially movably sleeved at the non-circular section 23 of the shaft 20. The tubular member 85 has a non-circular axial hole 87 coupled with the shaft 20 and is rotatable along with the shaft 20. Furthermore, when the shaft 20 is driven by the handle 29 to rotate, the tubular member 85 would be driven by the shaft 20 to rotate together with the first and third driving washers 61, 68.

Referring to FIGS. 3, 4 and 6, the brake adjusting device 90 is sleeved to the shaft 20 and abutted against an outer side of the tubular member 85. The brake adjusting device 90 includes a control member 91, a second spring member 95 sleeved to the shaft 20 and located between the tubular member 85 and the control member 91, and two normal washers 91 sleeved to the shaft 20 and located between the second spring member 95 and the control member 91. The control member 91 has a star drag 92, a nut 93 screwingly engaged to the thread section 27 of the shaft 20 and coupled with the star drag 92, and a spring 94 located between the star drag 92 and the nut 93. The second spring member 95 includes two second spring washers 96. A force toward the direction D1 is applied on the control member 91 and the two normal washer 97, and another force toward the direction D2 is applied on the tubular member 85 by the second spring member 95. Furthermore, when the control member 91 is screwingly threaded toward the direction D2, the control member 91 would move toward the direction D2 and push the second spring member 95 through the two normal washers 97, so that the second spring member 95 pushes the tubular member 85, and the tubular member 85 moves toward the third driving washer 68. In addition, when the tubular member 85 cannot move anymore, the control member 91 may keep being screwingly threaded toward the direction D2, so that the second spring member 95 is pressed as shown in FIG. 7.

The aforementioned description is related to the structural design of the brake mechanism 50, and one of objectives of the structural design is providing a brake function for the spool 40. In the following, a brake control method of the brake mechanism 50 would be described with FIGS. 6 and 7.

Referring to FIG. 6, when the control member 91 of the brake adjusting device 90 is screwingly threaded toward the direction D2, a brake force can be transmitted by the control member 91 through the two normal washers 91, the second spring member 95 and the tubular member 85, so that frictional forces for the rotations of the gear 30 and the second driving member 65 relative to the shaft 20 would be enlarged, a damping for a motion which the spool 40 rotates relative to the shaft 20 is also enlarged, which makes the fishing line stop being reeled out. Referring to FIG. 7, when the control member 91 is screwingly threaded to its limit, the brake force for reeling out the fishing line from the spool 40 reaches its maximum, and the a rotation of the handle 29 can drive the gear 30 to rotate together with the spool 40, in the meantime, the spring member 80 is pressed.

On the other hand, how to release the brake status would be described in the following. Referring to FIG. 7, when the control member 91 of the brake adjusting device 90 is screwingly threaded toward the direction D1, a force would be applied on the first, second and third driving washers 61, 65, 68 and the second and third brake washers 67, 69 by the spring member 80 to move toward the tubular member 85, so that the frictional forces for the rotations of the gear 30 and the second driving member 65 relative to the shaft 20 would be decreased, the damping for the motion which the spool 40 rotates relative to the shaft 20 is also decreased, and the brake status would be released as shown in FIG. 6 illustrating the spring member 80 is not pressed. By using the aforementioned structure, a prestressing force provided by the spring member 80 would be applied for releasing the brake status reliably. Therefore, the brake status would be released quickly when the control member 91 is screwingly threaded toward the direction D1 by the user during a fish is hooked. Even though the first and third driving washers 61, 68 are stuck on the shaft 20, the first and third driving washers 61, 68 still can be drive by the spring member 80 to be separated from the shaft 20, so that brake status being released can be ensured.

Figure 8:
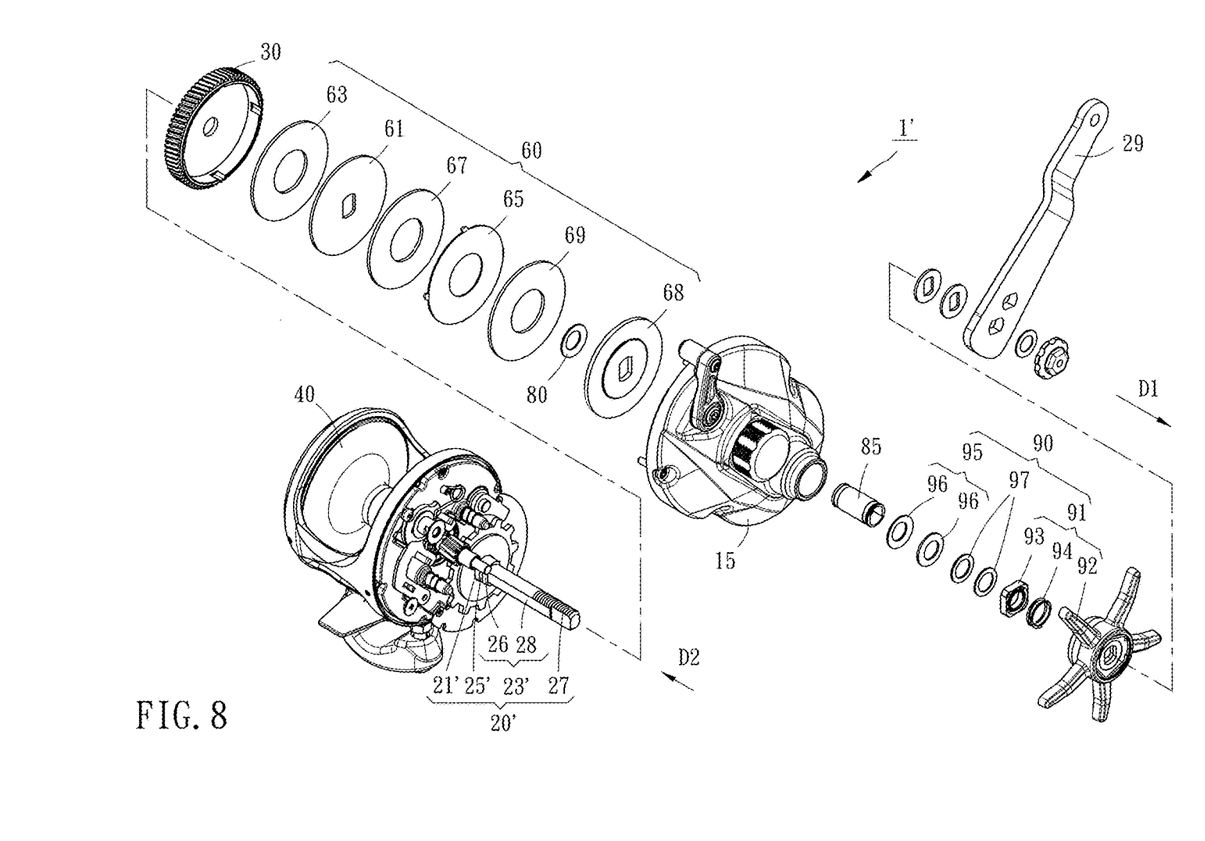
FIG. 8 is an exploded perspective view of part of the fishing reel according to a second preferred embodiment of the present invention.
Figure 9:
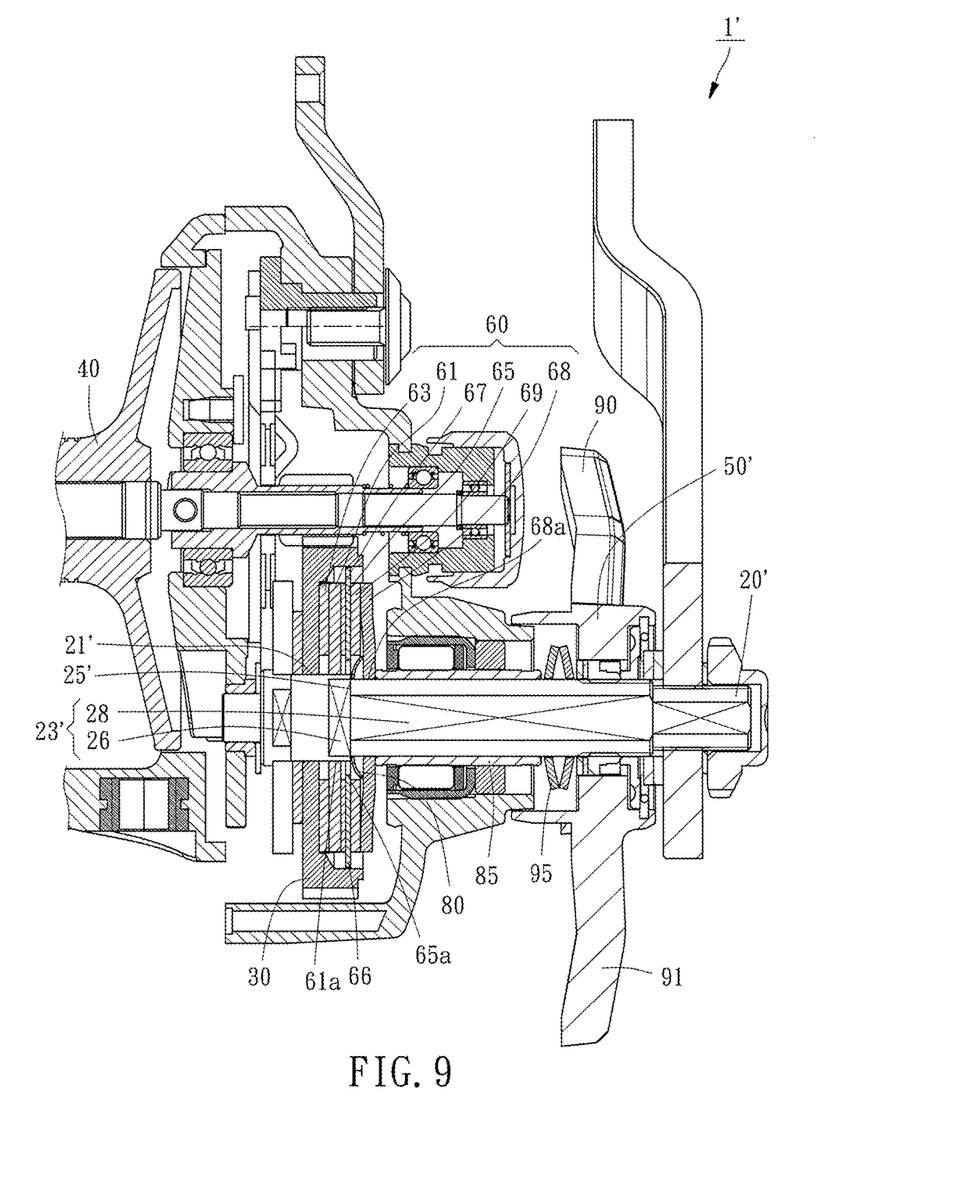
FIG. 9 is a section view of part of the fishing reel according to the second preferred embodiment of the present invention, which illustrates the fishing reel is in a non-brake status.

Based on the spirit of the first preferred embodiment, the structures of the shaft 20 and the brake mechanism 50 can be modified. Referring to FIGS. 8 and 9, differences between a fishing reel 1' of a second preferred embodiment and the first preferred embodiment are, a non-circular section 23' of a shaft 20' is formed by a large non-circular section 26 extending outwardly from a circular section 21' and a small non-circular section 28 extending outwardly from the large non-circular section 26; the brake mechanism 50' comprises a second stair portion 25' located between the large and small non-circular section 26, 28; two ends of the spring member 80 are abutted against the inner side of the third driving washer 68 and the outer side of the second stair section 25', respectively.

In the present embodiment, when the control member 91 of the brake adjusting device 90 is screwingly threaded toward the direction D1, a force would be applied on the third driving washers 68 by the spring member 80 to move toward the tubular member 85, the normal force applied on the gear 30 by the whole washer set 60 would be decreased, so that the frictional forces for the rotations of the gear 30 and the second driving member 65 relative to the shaft 20' would be decreased, the damping for the motion which the spool 40 rotates relative to the shaft 20' is also decreased, and the brake status would be released. In addition, if the third driving washer 68 is stuck on the shaft 20', the third driving washer 68 still can be driven by the spring member 80 to be separated from the shaft 20'.

Based on the spirit of the invention, the structure of the brake mechanisms 50, 50' can be modified. For example, the four protruded portions 66 of the second driving washer 66 are used for being coupled with the gear 30 and rotatable together with the gear 30, however, other coupling structures also can be applied. The second spring member 95 is used for providing a restoring force to the control member 91 and the tubular member 85 and providing a buffer for the brake force, however, the second spring member 95 can be omitted or replaced by other washer, and performing a brake or releasing the brake status still can be operated properly. The spring member 80 and the second spring member 95 can be a spring or other elastic member. Furthermore, in order to make the second driving washer 65 rotate relative to the shafts 20, 20' successfully, the section of the large non-circular section 26 corresponding to the second driving washer 65 can be replaced by another circular section (not shown).

The above description represents merely the preferred embodiment of the present invention, without any intention to limit the scope of the present invention. The simple variations and modifications not to be regarded as a departure from the spirit of the invention are intended to be included within the scope of the following claims.

What is claimed is:

1. A brake mechanism of a fishing reel, the fishing reel having a main body, a shaft rotatably disposed at the main body, a handle disposed at the shaft and rotatable along with the shaft, a gear sleeved to the shaft, and a spool disposed at the main body and rotatable by the gear; the shaft having a circular section to which the gear is sleeved, a non-circular section extending outwardly from the circular section, and a thread section extending outwardly from the non-circular section; the brake mechanism comprising:

a washer set, comprising a first driving washer having a first non-circular hole through which the shaft extends and sleeved at the non-circular section, and a first brake washer sleeved at the non-circular section of the shaft and located between the first driving washer and the gear, the first driving washer being coupled with the shaft and rotatable along with the shaft;

a tubular member, axially movably disposed at the non-circular section of the shaft and provided with an end abutting against an outer side of the washer set;

a brake adjusting device, sleeved to the shaft and abutting against an outer side of the tubular member, the brake adjusting device comprising a control member screwingly engaged to the thread section of the shaft;

a first stair portion, located between the circular section and the non-circular section; and a spring member, sleeved to the shaft and provided with two ends abutting against the first driving washer and the first stair portion, respectively.

2. The brake mechanism of the fishing reel as claimed in claim 1, wherein the spring member is a spring washer.

3. The brake mechanism of the fishing reel as claimed in claim 1, wherein the washer set further comprises a second driving washer having a circular hole through which the shaft extends and sleeved at the non-circular section outside the first driving washer, a second brake washer sleeved at the non-circular section of the shaft and located between the second driving washer and the first driving washer, a third driving washer having a second non-circular hole through which the shaft extends and sleeved at the non-circular section outside the second driving washer, and a third brake washer sleeved at the non-circular section of the shaft and located between the second driving washer and the third driving washer; the gear has at least one notch; a periphery of the second driving washer has at least one protruded portion inserting into the at least one notch, so that the second driving washer is coupled with the gear and rotatable together with the gear; the third driving washers is coupled with the shaft and rotatable along with the shaft.

4. The brake mechanism of the fishing reel as claimed in claim 1, wherein the brake adjusting device further comprises a second spring member sleeved to the shaft and located between the tubular member and the control member; and the second spring member comprises a plurality of second spring washers.

5. The brake mechanism of the fishing reel as claimed in claim 1, wherein the tubular member is coupled with the shaft and rotatable along with the shaft.

6. A brake mechanism of a fishing reel, the fishing reel having a main body, a shaft rotatably disposed at the main body, a handle disposed at the shaft and rotatable along with the shaft, a gear sleeved to the shaft, and a spool disposed at the main body and rotatable by the gear; the shaft having a circular section to which the gear is sleeved, a non-circular section extending outwardly from the circular section, and a thread section extending outwardly from the non-circular section; the brake mechanism comprising:

a washer set, comprising a first driving washer having a first non-circular hole through which the shaft extends and sleeved at the non-circular section, a first brake washer sleeved at the non-circular section of the shaft and located between the first driving washer and the gear, a second driving washer having a circular hole through which the shaft extends and located outside the first driving washer, a second brake washer sleeved at the non-circular section of the shaft and located between the second driving washer and the first driving washer, a third driving washer having a second non-circular hole through which the shaft extends and sleeved at the non-circular section outside the second driving washer, and a third brake washer sleeved at the non-circular section of the shaft and located between the second driving washer and the third driving washer; the first and third driving washers being coupled with the shaft and rotatable along with the shaft; and the second driving washer being coupled with the gear and rotatable together with the gear;

a tubular member, axially movably disposed at the non-circular section of the shaft and provided with an end abutting against an outer side of the third driving washer;

a brake adjusting device, sleeved to the shaft and abutting against an outer side of the tubular member, the brake adjusting device comprising a control member screwingly engaged to the thread section of the shaft;

a second stair portion, located between a large non-circular section and a small non-circular section extending outwardly from the large non-circular section; the large non-circular section and the small non-circular section forming the non-circular section of the shaft; and a spring member, sleeved to the shaft and provided with two ends abutting against the third driving washer and the second stair portion, respectively.

7. The brake mechanism of the fishing reel as claimed in claim 6, wherein the spring member is a spring washer.

8. The brake mechanism of the fishing reel as claimed in claim 6, wherein the gear has at least one notch, and a periphery of the second driving washer has at least one protruded portion inserting into the at least one notch.

9. The brake mechanism of the fishing reel as claimed in claim 6, wherein the brake adjusting device further has a second spring member sleeved to the shaft and located between the tubular member and the control member; the second spring member comprises a plurality of second spring washers.

10. The brake mechanism of the fishing reel as claimed in claim 6, wherein the tubular member is coupled with the shaft and rotatable along with the shaft.

* * * * *